United States Patent Office 3,377,154
Patented Apr. 9, 1968

3,377,154
PYRIDAZONE DERIVATIVES CONTAINING A TARTRONIC ESTER RADICAL AND METHOD FOR CONTROLLING UNDESIRABLE VEGETATION WITH SAME
Franz Reicheneder, Ludwigshafen (Rhine), Germany; and Karl Dury, deceased, late of Kirchheimbolanden, Pfalz, Germany, by Franz Winter, representative, Ludwigshafen (Rhine), Germany, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Sept. 30, 1966, Ser. No. 584,074
Claims priority, application Germany, Oct. 13, 1965, B 84,075
5 Claims. (Cl. 71—92)

The present invention relates to new pyridazone compounds, particularly those which contain a tartronic ester radical and have good herbicidal action. The present invention also relates to a method for controlling unwanted plants with the said compounds without damage to crop plants.

An object of the invention is to provide new pyridazone compounds which contain a tartronic ester radical. Another object of the invention is to provide a method of controlling unwanted plants with the said compounds without damage to crop plants.

It is known that 1-phenyl - 4-amino - 5-chloropyridazone-6 (hereinafter referred to as (A)) and 2-chloro-4,6-bis-(ethylamino)-s-triazine (hereinafter referred to as (B)) may be used as herbicides, but their effect is not satisfactory.

We have found that herbicidal compositions which contain a pyridazone derivative having the general formula

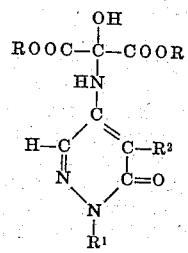

in which $R^1$ denotes a phenyl radical which may bear fluorine atoms, chlorine atoms or methyl groups as substituents, or a cyclohexyl radical or cyclooctyl radical, $R^2$ denotes a chlorine atom, a bromine atom, an iodine atom or the methoxyl radical or thiomethyl radical, and R denotes an alkyl radical having one to four carbon atoms which may bear chlorine atoms, bromine atoms, methoxy groups or ethoxy groups, or the benzyl radical, have good herbicidal action.

The new active ingredients may be prepared by condensing appropriate 4-aminopyridazones with mesoxalic acid esters.

The method of preparing N-[4-(1-phenyl - 5-chloropyridazon - (6)-yl]-aminotartronic diethyl ester is described below by way of illustration. 11 parts (by weight) of 1-phenyl-4-amino-5-chloropyridazone-(6), 8.7 parts of mesoxalic diethyl ester and 100 parts of xylene are boiled for three hours under reflux. After the reaction solution has been evaporated down to about one third (through evaporation of the xylene), 18 parts of the tartronic acid derivative crystallizes out which after recrystallization from benzene/petroleum ether melts at 131° to 132° C. and after resolidifying at 170° to 173° C.

Active ingredients having the above general formula in which $R^1$, $R^2$ and R have the meanings given in the following Table are given as specific examples:

| $R^1$ | $R^2$ | R | M.P. (° C.) |
|---|---|---|---|
| $C_6H_5$— | Cl— | —$C_2H_5$ | 131–132 |
| $C_6H_5$— | Br— | —$C_2H_5$ | |
| $C_6H_{11}$— | Cl— | —$C_2H_5$ | |
| $C_6H_{11}$— | Br— | —$C_2H_5$ | |
| $C_8H_{15}$— | Cl— | —$CH_3$ | |
| $C_8H_{15}$— | Br— | —$CH_3$ | |

Herbicides according to the invention may be prepared in a conventional way by mixing the active ingredients with solid or liquid carriers, for example water, hydrocarbons, clay, fertilizers, borax or diatomaceous earth.

Wetting agents, dispersing agents, adhesives and other biologically active agents may also be added.

The following examples illustrate the use of the herbicides according to the invention and their advantages over prior art herbicides.

Example 1

Seeds of Indian corn (Zea mays), beet (Beta vulgaris), white goosefoot (Chenopodium album), amaranth pigweed (Amaranthus retroflexus), chickweed (Stellaria media), small nettle (Urtica urens), camomile (Matricaria chamomilla), wild mustard (Sinapis arvensis), and annual meadow grass (Poa annua) are sown in a greenhouse and treated on the same day with N-[4-(1-phenyl-5-chloropyridazon)-yl]-aminotartronic diethyl ester (I) and, for comparison, with (A), the rate of application being 2 kg. per hectare of active ingredient dispersed in an amount of water equivalent to 500 liters per hectare. The results of the experiment may be seen in the following table: 0=no damage; 100=total destruction.

| | Active ingredient | |
|---|---|---|
| | (I) | (A) |
| Crop plants: | | |
| Indian corn | 0 | 10 |
| Beet | 0 | 0 |
| Unwanted plants: | | |
| White goosefoot | 90–100 | 70–80 |
| Amaranth pigweed | 90–100 | 80–90 |
| Chickweed | 90 | 70 |
| Small nettle | 100 | 90 |
| Camomile | 90 | 80 |
| Wild mustard | 90–100 | 80 |
| Annual meadow grass | 90 | 80 |

In this Example and in Examples 2, 3 and 4, the following compounds exhibit the same biological effect as the compound (I): the diethyl esters of:

N-[4-(1-phenyl - 5-bromopyridazon)-yl]-aminotartronic acid

N-[4-(1-cyclohexyl - 5-chloropyridazon) - yl]-aminotartronic acid

N-[4-(1-cyclohexyl - 5-bromopyridazon) - yl]-aminotartronic acid

N-[4-(1-cyclooctyl - 5-chloropyridazon) - yl]-aminotartronic acid

N-[4-(1-cyclooctyl - 5-bromopyridazon)-yl] - aminotartronic acid.

Example 2

Plants grown from the same kinds of seeds as used in Example 1 are treated at a growth height of 5 to 20 cm. with (I) and for comparison with (A) at the rate of 2 kg. per hectare of active ingredient dispersed in an amount of water equivalent to 500 liters per hectare. The results of the experiment can be seen in the following table in which 0 denotes no damage and 100 denotes total destruction:

| | Active ingredient | |
|---|---|---|
| | (I) | (A) |
| Crop plants: | | |
| Indian corn | 0 | 0 |
| Beet | 0–10 | 0–10 |
| Unwanted plants: | | |
| White goosefoot | 100 | 80–90 |
| Amaranth pigweed | 100 | 80 |
| Chickweed | 100 | 90 |
| Small nettle | 100 | 80 |
| Camomile | 90 | 80 |
| Wild mustard | 90–100 | 80 |
| Annual meadow grass | 90 | 90 |

Example 3

An agricultural cultivated area which is sown with wild mustard (*Sinapis arvensis*), chickweed (*Stellaria media*), white goosefoot (*Chenopodium album*), small nettle (*Urtica urens*), gallant soldier (*Galinsoga parviflora*), annual meadow grass (*Poa annua*) and slender foxtail (*Alopecurus myosuroides*) is treated on the day of sowing with (I) and, for comparison, with (B), at the rate of 5 kg. of active ingredient each per hectare, dispersed in an amount of water equivalent to 500 liters per hectare. After the plants have emerged it is evident that (I) has stronger initial action than (B). Four weeks later almost all the plants have completely withered.

Example 4

An agricultural cultivated area which is overgrown with the plants itemized in Example 3 is treated with (I) and, for comparison, with (B), by spraying at a growth height of 3 to 8 cm. at the rate of 5 kg. of active ingredient each per hectare dispersed in an amount of water equivalent to 500 liters per hectare. After some days it is evident that (I) has a stronger initial herbicidal action than (B). Three weeks later almost all the plants are completely withered.

We claim:
1. A compound having the formula

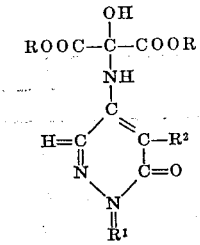

in which $R^1$ is a member selected from the group consisting of phenyl, fluoro-substituted phenyl, chloro-substituted phenyl, methyl-substituted phenyl, cyclohexyl and cyclooctyl, $R^2$ is a member selected from the group consisting of chlorine, bromine, iodine, methoxyl, and thiomethyl and R is a member selected from the group consisting of alkyl of 1 to 4 carbon atoms, chloro-substituted alkyl of 1 to 4 carbon atoms, bromo-substituted alkyl of 1 to 4 carbon atoms, methoxy-substituted alkyl of 1 to 4 carbon atoms, ethoxy-substituted alkyl of 1 to 4 carbon atoms, and benzyl.

2. A method of controlling unwanted plant growth contacting said plant growth with a phytotoxic amount of a compound having the formula

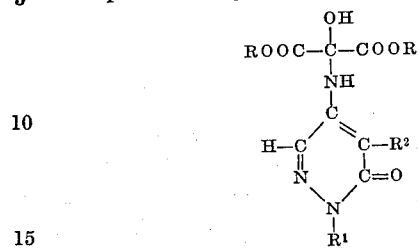

in which $R^1$ is a member selected from the group consisting of phenyl, fluoro-substituted phenyl, chloro-substituted phenyl, methyl-substituted phenyl, cyclohexyl and cyclooctyl, $R^2$ is a member selected from the group consisting of chlorine, bromine, iodine, methoxyl, and thiomethyl and R is a member selected from the group consisting of alkyl of 1 to 4 carbon atoms, chloro-substituted alkyl of 1 to 4 carbon atoms, bromo-substituted alkyl of 1 to 4 carbon atoms, methoxy-substituted alkyl of 1 to 4 carbon atoms, ethoxy-substituted alkyl of 1 to 4 carbon atoms, and benzyl.

3. A method of controlling unwanted plant growth which comprises treating the soil in which the plants are growing or are to grow with a phytotoxic amount of a compound having the formula

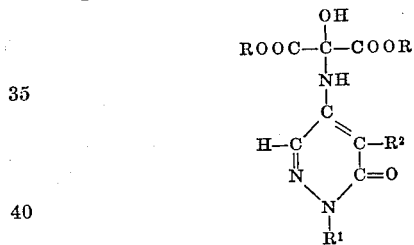

in which $R^1$ is a member selected from the group consisting of phenyl, fluoro-substituted phenyl, chloro-substituted phenyl, methyl-substituted phenyl, cyclohexyl and cyclooctyl, $R^2$ is a member selected from the group consisting of chlorine, bromine, iodine, methoxyl, and thiomethyl and R is a member selected from the group consisting of alkyl of 1 to 4 carbon atoms, chloro-substituted alkyl of 1 to 4 carbon atoms, bromo-substituted alkyl of 1 to 4 carbon atoms, methoxy-substituted alkyl of 1 to 4 carbon atoms, ethoxy-substituted alkyl of 1 to 4 carbon atoms, and benzyl.

4. N-[4-(1-phenyl-5-chloropyridazone)-yl]-aminotartronic diethyl ester.

5. N-[4-(1-phenyl-5-bromopyridazon-6)-yl]aminotartronic diethyl ester.

No references cited.

NICHOLAS S. RIZZO, *Primary Examiner.*

UNITED STATES PATENT OFFICE
CERTIFICATE OF CORRECTION

Patent No. 3,377,154                                    April 9, 1968

Franz Reicheneder et al.

It is certified that error appears in the above identified patent and that said Letters Patent are hereby corrected as shown below:

Column 3, lines 41 to 50, the formula should appear as shown below:

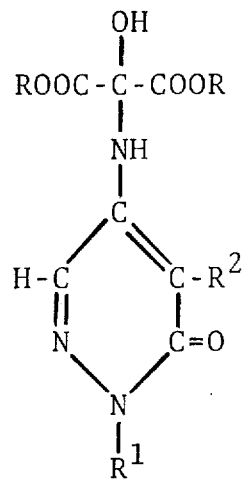

Signed and sealed this 2nd day of December 1969.

(SEAL)
Attest:

EDWARD M. FLETCHER, JR.                        WILLIAM E. SCHUYLER, JR.
Attesting Officer                                  Commissioner of Patents